UNITED STATES PATENT OFFICE.

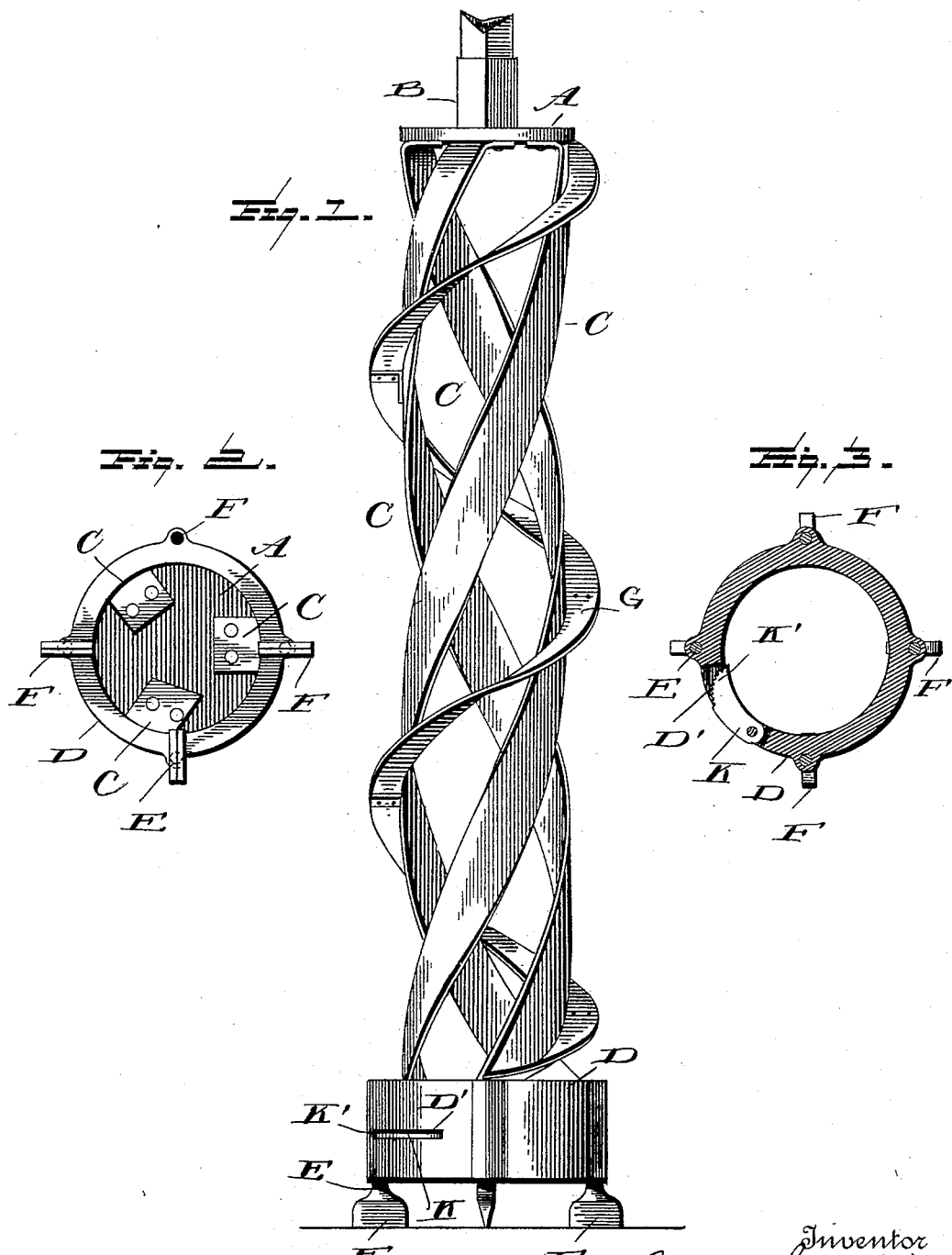

JOSEPH STEPHENS, OF FOREST CITY, PENNSYLVANIA.

HOLLOW AUGER.

SPECIFICATION forming part of Letters Patent No. 632,764, dated September 12, 1899.

Application filed March 25, 1899. Serial No. 710,466. (No model.)

*To all whom it may concern:*

Be it known that I, JOSEPH STEPHENS, a citizen of the United States, residing at Forest City, in the county of Susquehanna and State of Pennsylvania, have invented certain new and useful Improvements in Hollow Augers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in augers, and especially to a hollow auger designed for use in drilling through rock and soil and taking out a core, means being provided for severing the core when a reverse rotary movement is imparted to the auger.

More specifically, the present invention resides in the provision of a hollow auger made up of spirally-arranged body portions, about which is disposed a strengthening-strip, the lower portion of the auger having the cutting-knives for drilling the hole, while a horizontally-disposed and inwardly-swinging cutting-blade is provided, which is caused to cut off the core as the auger is reversed.

To these ends and to such others as the invention may pertain the same consists, further, in the novel construction, combination, and arrangement of parts, as will be hereinafter more fully described and then specifically defined in the appended claim.

My invention is clearly illustrated in the accompanying drawings, which, with the letters of reference marked thereon, form a part of this application, and in which drawings—

Figure 1 is a perspective view of my improved auger. Fig. 2 is a bottom plan view of the auger, showing the arrangement of the cutting-knives. Fig. 3 is a sectional view through the lower portion of the auger, showing the blade for cutting the core.

Reference now being had to the details of the drawings by letter, A designates the upper end of the auger, which has a socket B, in which the shaft of the drill or auger may be secured. The body portion of the auger is made up of the three spiral portions C, which are securely fastened to or may be integral with the ring D, which ring has the apertures E, in which the cutting-knives F engage. Disposed about the spiral body portion of the auger is a strip G, which is also spirally arranged and secured to the body portion of the auger at each point of its contact with said spiral portions. This strip is provided for the purpose of holding the spiral portions of the auger true, so that they will not spring, and will support them in such a manner that they will have common centers. In said ring, at the lower part of the auger, is a slot D', in which is pivoted one end of the V-shaped blade K, which has a toothed edge K', that is brought into play only when the rotary movement of the auger is reversed after a core has been drilled. In the reverse movement of the auger said blade, owing to the peculiar manner of mounting it, will be caused to be thrown out and into the bore of the auger, and the toothed edge will come in contact with the core and sever the same, thus allowing the latter to be readily withdrawn from the hole being drilled.

Having thus described my invention, what I claim to be new, and desire to secure by Letters Patent, is—

A hollow auger comprising the spiral strips C, the solid plate A to which the upper ends of said strips are fastened, the ring D forming the lower end of the body portion of the auger, the reinforcing coiled strips G extending from plate A to ring D and secured to strips C, at its points of contact therewith, the cutting-knives F and the core-cutting knife K, pivoted in a slot in said ring, the free end of said knife being curved, and provided with a series of teeth, whereby on the reverse movement of the auger said teeth are adapted to cut into the core, and sever same, as shown and described.

In testimony whereof I affix my signature in presence of two witnesses.

JOSEPH STEPHENS.

Witnesses:
 DANIEL DWYER,
 FRANK CUNNINGHAM.